June 9, 1953 — O. A. CLEMENS ET AL — 2,641,020
CHITTERLING PREPARING MACHINE
Filed Nov. 3, 1949 — 3 Sheets-Sheet 3
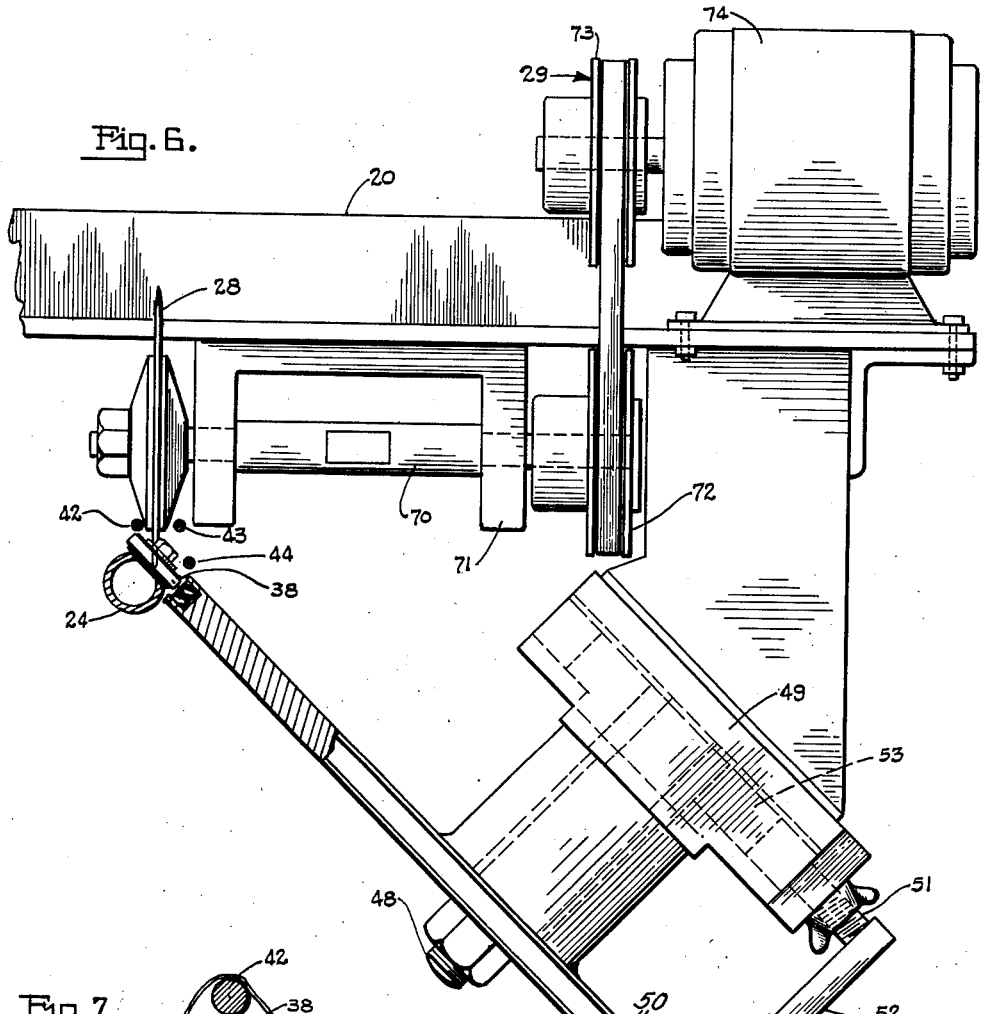
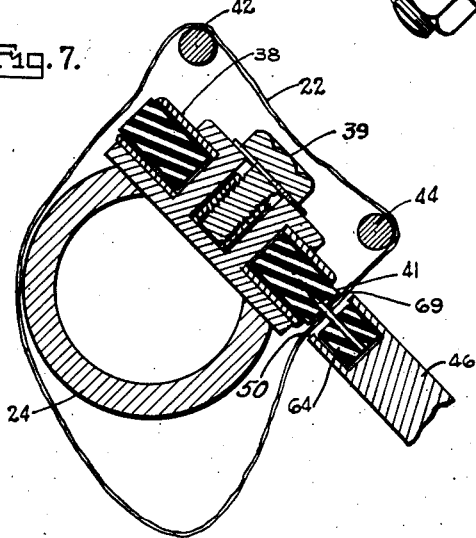
INVENTOR.
Ogden. A. Clemens.
Raymond. O. Mertens.
Max. Walckhof.
BY
R. A. Story
ATTORNEY Patented June 9, 1953

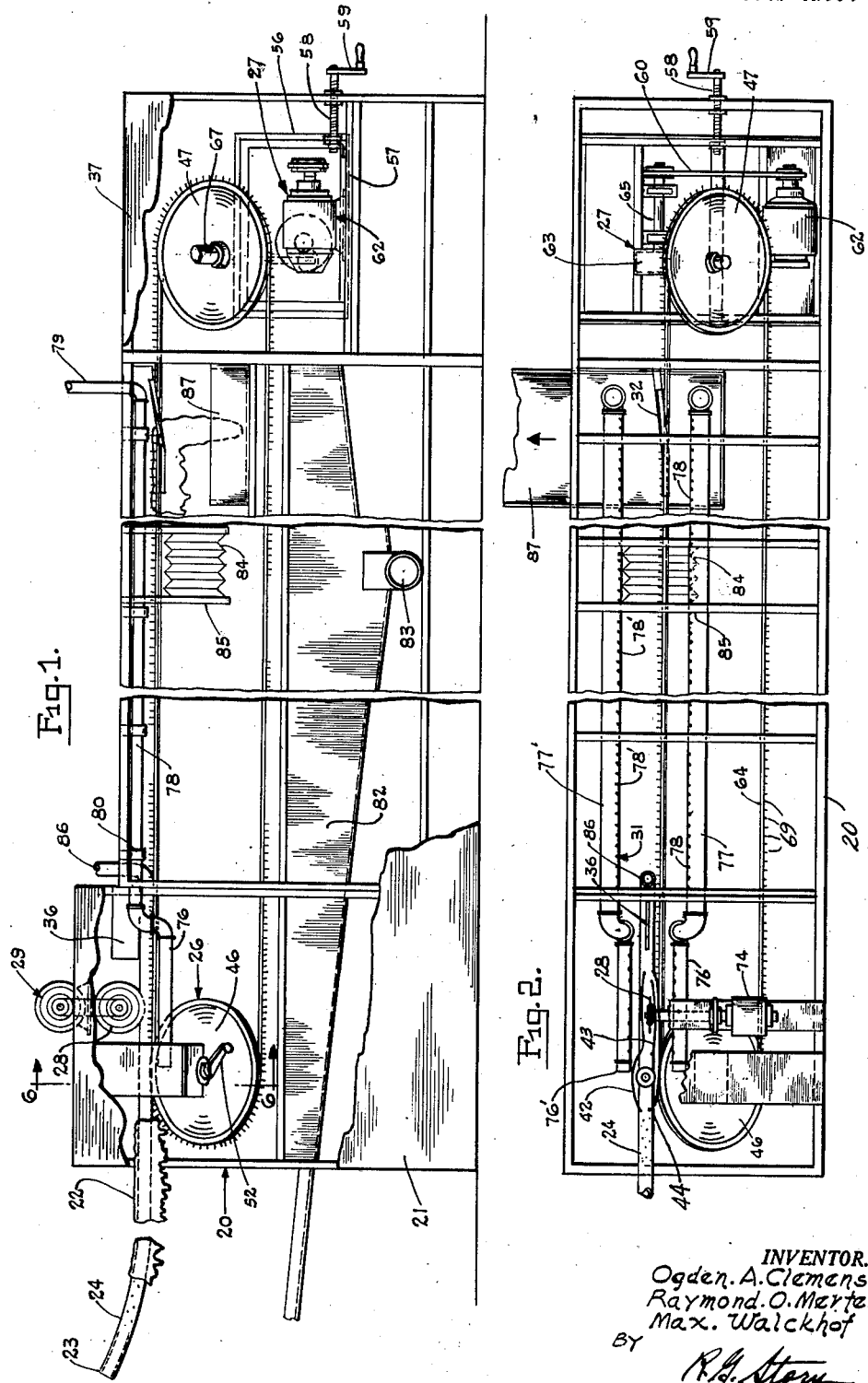

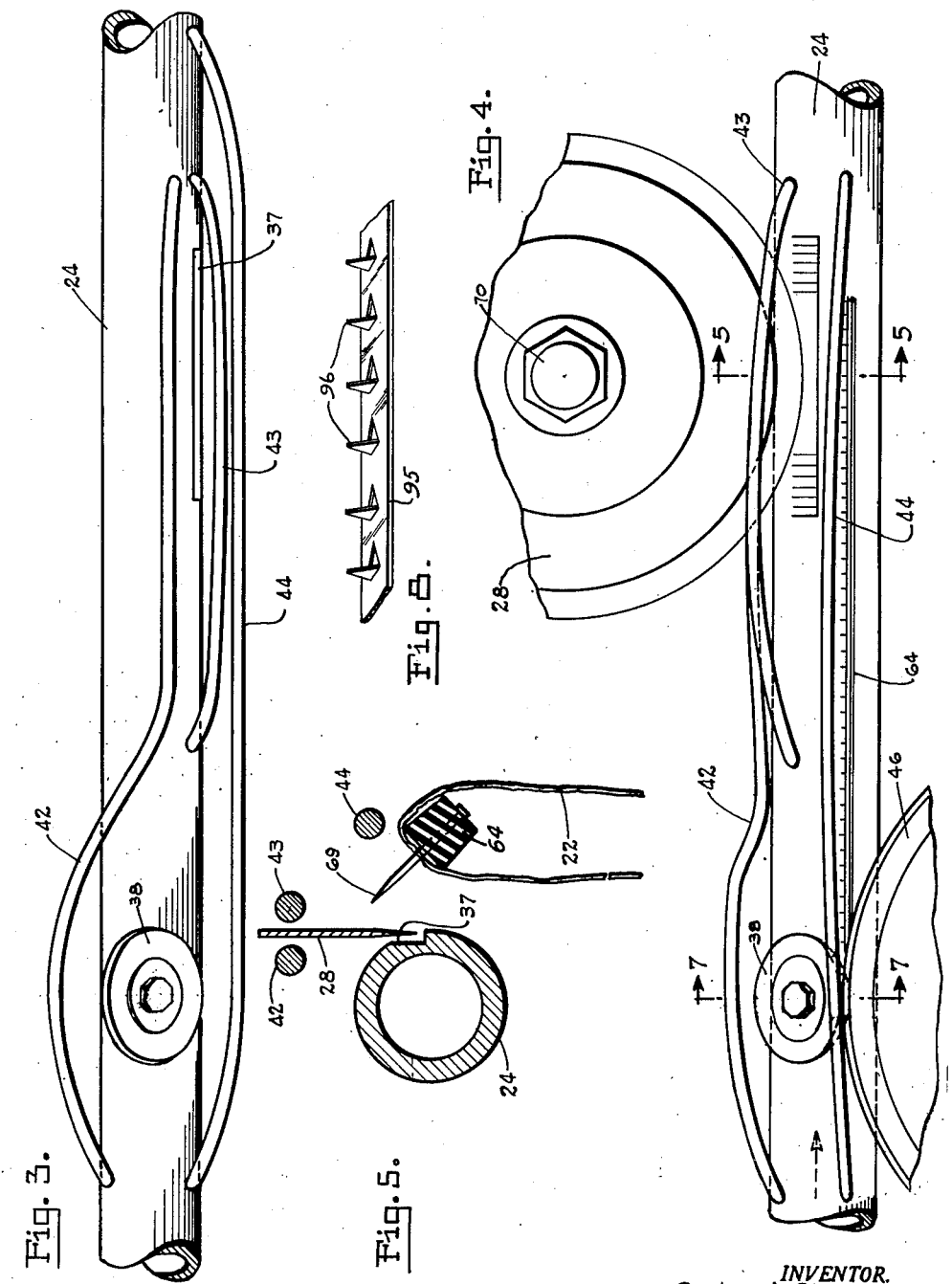

2,641,020

UNITED STATES PATENT OFFICE 2,641,020

CHITTERLING PREPARING MACHINE

Ogden A. Clemens and Raymond O. Mertens, Chicago, and Max Walckhof, Villa Park, Ill., assignors to Swift & Company, Chicago, Ill., a corporation of Illinois Application November 3, 1949, Serial No. 125,176

15 Claims. (Cl. 17—43)

The present invention relates to an apparatus for preparing chitterlings or the like for edible purposes.

The market for chitterlings is generally in excess of the supply despite the fact that the casings, from which the chitterlings may be made, are obtained in large quantities as a "by-product" in the slaughter of animals. The amount of hand labor involved in preparing the chitterlings for the market has made it generally impractical to attempt to process any more than a small fraction of the available product.

The principal object of the present invention is to provide a machine into which a casing may be inserted and which will discharge the casing thoroughly washed and slit longitudinally from one end to the other. With the present invention the same amount of unskilled labor may be used to produce many times the amount of chitterlings which would ordinarily be produced by manual operation alone. The operations required of the manual labor are extremely simple and, as a result, there is no necessity of training skilled machine operators. The only steps required are feeding the casings into one end of the machine, removing the split and washed product from the other end thereof, and inspecting the discharged product.

Additional objects and advantages include: continuous processing, thorough cleaning of casings, simplicity of manufacturing processes involved in producing the machine resulting in a relatively low capital investment, a minimum of moving parts to require care and replacement, and simplicity of operation.

Further objects and advantages will become apparent from the following description taken in conjunction with the drawings, in which:

Fig. 1 is an elevation of an embodiment of the present invention with the side panels broken away to illustrate the structure thereof;

Fig. 2 is a plan view of the machine illustrated in Fig. 1 with the covers thereof removed;

Fig. 3 is an enlarged plan view of a portion of the mandrel at the splitting station;

Fig. 4 is an elevational view of the portion of the mandrel illustrated in Fig. 3 and also showing the rotary knife and belt feed;

Fig. 5 is a section taken at line 5—5 of Fig. 4;

Fig. 6 is a section taken at line 6—6 of Fig. 1;

Fig. 7 is a section taken at line 7—7 of Fig. 4; and

Figure 8 is an enlarged partial view of an alternative form of a belt.

The following description of a specific embodiment is in compliance with Section 4888 of the Revised Statutes and should not be construed as imposing unnecessary limitations upon the appended claims.

Referring to Figs. 1 and 2, a box-like frame 20 covered by enclosure panels 21 supports and carries the various elements that go to make up the present invention. Before specifically describing the various details of the structure, it may be helpful to explain in a very general way the procedure followed in the preparation of the casings with the instant invention.

The casings 22, which are somewhat tubular in form, are slid over the unsupported end 23 of the mandrel 24. The casing moves along the mandrel generally by gravity or by being pushed by hand to a point where it is engaged by a belt feed mechanism, generally 26, driven by a power means, generally 27. The belt feed mechanism draws the casing by a rotary knife 28 driven by a power means, generally 29. The casing is sprayed both before and after splitting by a spraying means, generally 31. After the split casing has moved through a sufficient spray washing area, it contacts a take-off 32 which disengages the casing from the belt in order that it may be removed from the machine.

Mandrel

The mandrel 24 is supported from frame 20 by a vertical bracket 36 attached to frame 20 and secured to the top face of the mandrel 24. At a point between the two ends of the mandrel, the mandrel is cut away as illustrated at 37 in Fig. 5 to receive and prevent contact with the rotary knife 28. In some embodiments the knife may be positioned a greater distance above the mandrel and, in such a case, the cut-away portion 37 may be found to be unnecessary.

At a second point along the mandrel, between unsupported end 23 thereof and the cut-away portion 37, is a rotative pickup wheel 38 suitably journaled about a stud bolt 39 (Fig. 7). The pickup wheel 38 has a soft rubber face 41 to receive the spikes of the belt feed mechanism 26 as hereinafter explained.

Three rods 42, 43, and 44 are attached to the mandrel and serve the function of guides and guards. They hold the casing about the mandrel and prevent the casing from jamming against wheel 38, as illustrated in Fig. 7. Also, they hold the top of the casing sufficiently high that it contacts the front of knife 28 as illustrated in Figs. 4 and 5 to prevent any tendency on the part of the casing to work under the knife rather than being cut by the knife.

Belt feed mechanism

The belt feed mechanism 26 includes a pair of pulleys 46 and 47, pulley 46 being an idler pulley and pulley 47 being driven by power means 27. Pulley 46 is journaled on a spindle 48 mounted in a frame 49 in such a manner that it may be moved back and forth along a line normal to the axis of the spindle 48 and to the axis of the mandrel 24. The peripheries 50 of pulleys 46 and 47 are recessed to receive a belt. Spindle 48 is mounted so that one portion of the recessed periphery 50 of pulley 46 is adjacent the mandrel 24 as illustrated in Figs. 6 and 7. Spindle frame 49 is attached to the machine frame 20 and is threaded to receive an adjusting screw 51 rotatable by means of crank 52. Referring particularly to Fig. 6, a spindle base 53 is mounted in the ways of spindle frame 49 and connected to an adjusting screw 51 so that as crank 52 is rotated pulley 46 is moved towards or away from wheel 38 on mandrel 24.

The power means for driving the belt is mounted in a sub-frame 56 supported on ways 57 forming a part of the main frame 20. A screw and crank, 58 and 59 respectively, permit the sub-frame 56 to be moved back and forth along the ways to adjust the tension of the belt 64 between pulleys 46 and 47.

A motor 62 drives a gear box 63 through a belt 60 and a shaft 65. Projecting upwardly at an angle to the horizontal from the gear box is a shaft 67 upon which is mounted pulley 47. The angle is such that the axis of rotation of pulley 47 is parallel to the axis of rotation of pulley 46. The motor 62, gear box 63, and pulley 47 are all mounted on sub-frame 56.

The belt 64 carries a plurality of projecting spikes formed by needles 69 projecting through the belt as is best shown in Fig. 7. The spikes engage the casing 22 by puncturing the casing as the spikes are received in the soft rubber face 41 of pick-up wheel 38. The wheel 38 supports the inner face of the casing 22 so that as the belt travels around pulley 46 towards the mandrel 24, the spikes 69 are driven through the casing to engage the casing, draw it along the mandrel to the knife 28 and to thereafter support the casing for washing.

The belt is positioned at an angle to the horizontal to better retain the casing 22 on spikes 69 and is somewhat below the point of contact between knife 28 and casing 22 in order that the split casing will drape over the belt for most satisfactory washing. The two pulleys 46 and 47 are positioned so that the portion of belt 64 adjacent the mandrel 24 will be substantially parallel to the mandrel.

Knife mechanism

Referring particularly to Fig. 6, the knife 28 is suitably held on a jack shaft 70 journaled in a holder 71 mounted on a frame 20. A pulley 72 on the other end of shaft 71 is belt connected to a pulley 73 on the shaft of motor 74.

Spray means

The spray means includes provision for washing the outside of the casing before the casing is split and for washing the inner portion of the casing after it is split. To this end the spray means 31 includes two substantially identical spray lines, each of which is formed of an initial spray pipe 76 and 76' positioned to wash the casing before it is split and also during the splitting process, and a subsequent spray pipe 77 and 77' positioned so as to wash the casing after it is split. Each of these pipes has a plurality of orifices 78 and 78' along the inner face thereof to direct a spray of water onto the casings. Pipes 76 and 77 are connected together in series and at the end of pipe 77 a feed line 79 conducts wash water to the pipes from a suitable supply source.

The spray pipes are supported from frame 20 by a plurality of brackets 80. The wash water is collected in a drain box 82 and conducted to a discharge point from drain connection 83.

To insure that the pockets of the casing are thoroughly washed a bumper plate 84 is mounted from one of pipes 77 by means of a bracket 85. Bumper plate 84 is positioned at approximately a 45 degree angle to the vertical and below the belt 64. The bumper is preferably corrugated as illustrated in Figs. 1 and 2 although in some embodiments the corrugations may be eliminated. As it will be hereinafter explained, the larger portion of the casing, after splitting, will be hanging to the left of the belt 64 (when viewed in the direction of the line of travel of the belt along the mandrel, as in Figs. 5, 6, and 7) with a smaller portion of the casing hanging over the belt on the right side thereof. For this reason the high side of the bumper is on the right where it will contact the under side of the short piece of casing to the right of the belt and the low side of the bumper is to the left where it will contact the under side of the longer portion of the casing. As the casing rubs across the bumper 84, the corrugations of the bumper push out the pockets in the casing to insure a thorough washing of the casing.

To initially remove a majority of the material within the casing the mandrel 24 is provided with a plurality of fluid openings along the length thereof and water is injected into the supported end of the casing through a feed line 86 leading to a suitable source of supply. The fluid openings may be staggered about the periphery of the mandrel 24. Unsupported end 23 of the mandrel also may be open to permit water to be discharged therethrough.

Take-off

The take-off 32 is positioned astride the belt after the belt has passed through the spray washing area for a sufficient distance to thoroughly wash the casing. The receiving end of the take-off 32 (with respect to the direction of movement of the belt) is below the level of the belt with the rearward end being above the projecting tips of the spikes 69 on the belt.

In addition, the take-off is inclined to the left at substantially the same angle with respect to the horizontal as that of the belt 64 and pulleys 46 and 47. Thus, the upper face of the take-off is substantially normal to the longitudinal axis of spikes 69 and has a suitable opening therethrough to allow the belt 64 and spikes 69 to pass through the take-off.

A discharge chute 87 below the take-off receives the casings as they are removed from the belt and directs them to a suitable receptacle at the side of the machine.

Operation

The operator slides the casings over the unsupported end 23 of the mandrel 24 which is inclined sufficiently so that the weight of the casings will normally carry them along the mandrel until engaged by the belt. As the needles contact the casing, it is further dragged along the mandrel until it is opposite the pick-up wheel at which point the wheel offers sufficient support to the inner face of the casing to allow the spikes 69 to puncture the casing, as illustrated in Fig. 7.

Engaged by the belt the casing is further moved along the mandrel and is held up above the knife by guides 42 and 43. As the casing is split it falls down from around the mandrel with the majority of the casing being to the left of the belt because of the position of the knife with respect to the mandrel and belt. Rod 44 holds the right hand side of the casing sufficiently above the belt that when the right hand side of the casing falls away from the knife, it falls over the right side of the belt.

In this position the casing 22 is firmly supported on the belt and is in such a position that the inner portion thereof is laid open for thorough washing. The fact that the belt is below the point at which the casing contacts the knife allows this procedure to be carried out by the natural operation of gravity.

The casing on the belt then proceeds through the second spray washing area that is bounded by pipes 77 and 77'. In this area it contacts bumper 84 to clean any pockets that may exist in the casing. Further progress of the casing brings it into contact with take-off 32 upon which the casing gradually rides upwardly and toward the left so that the spikes 69 are withdrawn from the casing. The weight of the casing as it is lifted from the belt carries it downwardly to the left where it falls upon discharge chute 87 for removal from the machine.

The foregoing description is for the purpose of compliance with Section 4888 of the Revised Statutes and should not be construed as imposing any unnecessary limitations upon the appended claims. Such obvious modifications as using a stainless steel belt 95 having projecting points 96 punched out therefrom as shown in Figure 8 in place of rubber belt 64 with needles 69 may be made without departing from the spirit of the invention.

We claim:

1. In a device of the class described the combination of a frame, a mandrel about which a casing may be placed, said mandrel being mounted on said frame, cutting means mounted on said frame, the cutting edge of said means being aligned with and adjacent the mandrel to split casings moved along the mandrel, a belt, said belt having a plurality of spikes projecting therefrom, wheel means on said mandrel, over which the casing may be moved, and power-driven means to move said belt to said mandrel at said wheel with the spikes projecting into the wheel whereby the spikes puncture and engage the casing and the casing is moved past said cutting means to slit the casing.

2. In a device of the class described the combination of a frame, a mandrel about which a casing may be placed, said mandrel being supported by said frame, cutting means attached to said frame, the cutting edge of said means being aligned with and adjacent the mandrel to split casings moved along the mandrel, a belt, said belt having a plurality of spikes projecting therefrom, wheel means on said mandrel over which the casing may be moved, power-driven means to move said belt to said mandrel at said wheel with the spikes projecting into the wheel and thereafter to move the belt along the mandrel toward the cutting whereby the spikes puncture and engage the casing and the casing is moved thereby past said cutting means to slit the casing, and detaching means to move said casing relatively away from said belt in a direction longitudinally of said spikes to disengage said casing from said spikes.

3. In a device of the class described a frame, a mandrel having one end thereof mounted to said frame with the other end thereof being unsupported whereby a casing may be slipped over said mandrel, a rotatively mounted knife positioned on said frame to intersect said casing at a first point between the ends of said mandrel, power means operatively connected to said knife to rotate said knife, a pair of pulleys rotatively mounted on said frame, one of said pulleys having one portion of its periphery adjacent said mandrel at a second point between the unsupported end thereof and said first point, a belt about said pulleys, the other of said pulleys being beyond said mandrel mounting from said first point in such a position that the portion of the belt adjacent said mandrel is substantially parallel to said mandrel, a plurality of spikes projecting from said belt, spike receptive means on the mandrel adjacent said second point to support the inner portion of said casing at said second point, and power means to rotate said pulleys and said belt in such a direction that the portion of the belt adjacent the mandrel will move toward the supported end of the mandrel whereby the belt in passing over said one pulley will force said spikes into the casing supported against said spike receptive means and will thereafter carry the casing past the knife.

4. In a device of the class described a frame, a mandrel having one end thereof mounted to said frame with the other end thereof being unsupported whereby a casing may be slipped over said mandrel, a rotatively mounted knife positioned on said frame to intersect said casing at a first point between the ends of said mandrel, power means operatively connected to said knife to rotate said knife, a pair of pulleys rotatively mounted on said frame, one of said pulleys having one portion of its periphery adjacent said mandrel at a second point between the unsupported end thereof and said first point, means to move said pulley toward and away from said mandrel, a belt about said pulleys, the other of said pulleys being beyond said one end of said mandrel from said first point in such a position that the portion of the belt adjacent said mandrel is substantially parallel to said mandrel, a plurality of spikes projecting from said belt, said pulleys and said belt being so positioned that said projecting spikes are at an angle with respect to the horizontal, spike receptive means on the mandrel adjacent said second point to support the inner portion of said casing at said second point, and power means to rotate said pulleys and said belt in such a direction that the portion of the belt adjacent the mandrel will move toward the supported end of the mandrel whereby the belt in passing over said one pulley will force said spikes into the casing supported against said spike receptive means and will thereafter carry the casing past the knife.

5. In a device of the class described a frame, a mandrel having one end thereof mounted to said frame with the other end thereof being unsupported whereby a casing may be slipped over said mandrel, a rotatively mounted knife positioned on said frame to intersect said casing at a first point between the ends of said mandrel, power means operatively connected to said knife to rotate said knife, a pair of pulleys rotatively mounted on said frame, one of said pulleys having one portion of its periphery adjacent said mandrel at a second point between the unsupported end thereof and said first point, a belt about said pulleys, the other of said pulleys being beyond said one end of said mandrel from said first point in such a position that the portion of the belt adjacent said mandrel is substantially parallel to said mandrel, a plurality of spikes projecting from said belt, a wheel rotatively mounted on the mandrel at said second point with means at the surface of the wheel to receive said spikes and to support the inner portion of said casing at said second point, guard means on said mandrel to spread said casing in the area adjacent said two points, and power means to rotate said pulleys and said belt in such a direction that the portion of the belt adjacent the mandrel will move toward the supported end of the mandrel whereby the belt in passing over said one pulley will force said spikes into the casing supported against said wheel and will thereafter carry the casing past the knife.

6. In a casing splitting machine, a frame, a mandrel having one end thereof mounted to said frame with the other end thereof being unsupported whereby a casing may be slipped over said mandrel, casing cutting means mounted on said frame and positioned to intersect and cut an upper portion of said casing at a first point between the ends of the mandrel, casing engaging and supporting means mounted on said frame and position adjacent said first point and at a level lower than said upper portion of the casing whereby as said casing is cut at said first point the casing will fall away from the mandrel and over said engaging and supporting means with the interior of said casing exposed, and power means operatively connected to said engaging and supporting means to move said engaging and supporting means in the direction of the supported end of said mandrel to draw the casing past said cutting means.

7. In a casing splitting machine, a frame, a mandrel having one end thereof mounted to said frame with the other end thereof being unsupported whereby a casing may be slipped over said mandrel, casing cutting means mounted on said frame and positioned to intersect and cut an upper portion of said casing at a first point between the ends of the mandrel, a pair of pulleys rotatively mounted on said frame, one of said pulleys having one portion of its periphery adjacent said mandrel below the upper portion of said casing at a second point between the unsupported end thereof and said first point, a belt about said pulleys and having casing engaging means thereon, the other of said pulleys being beyond said mandrel mounting from said first point, and power means to rotate said pulleys and said belt in such a direction that the belt over said portion of said one pulley will engage the casing and move the casing past said cutting means whereupon the cut casing will fall away from the mandrel and over said belt with the interior of the casing exposed.

8. In a casing splitting machine, a frame, a mandrel having one end thereof mounted to said frame with the other end thereof being unsupported whereby a casing may be slipped over said mandrel, a knife mounted on said frame and positioned to intersect and cut an upper portion of said casing at a first point between the ends of the mandrel, a pair of pulleys rotatively mounted on said frame, one of said pulleys having one portion of its periphery adjacent said mandrel below said upper portion of said casing at a second point between the unsupported end thereof and said first point, a belt about said pulleys and having casing engaging means thereon, said belt being relatively narrow as compared with the circumference of said casings, the other of said pulleys being beyond said mandrel mounting from said first point in such a position that the portion of the belt adjacent said mandrel is substantially parallel to said mandrel, and power means to rotate said pulleys and said belt in such a direction that the belt over said portion of said one pulley will engage the casing and move the casing past said knife whereupon the cut casing will fall away from the mandrel and over said belt with the interior of the casing exposed.

9. In a casing splitting machine, a frame, a mandrel having one end thereof mounted to said frame with the other end thereof being unsupported whereby a casing may be slipped over said mandrel, casing cutting means mounted on said frame and positioned to intersect and cut an upper portion of said casing at a first point between the ends of the mandrel, a pair of pulleys rotatively mounted on said frame, one of said pulleys having one portion of its periphery adjacent said mandrel below said upper portion of said casing at a second point between the unsupported end thereof and said first point, a belt about said pulleys and having a plurality of sharp spikes projecting therefrom, the other of said pulleys being beyond said mandrel mounting from said first point, said belt being positioned on said pulleys such that the spikes on the portion of the belt adjacent the mandrel project generally toward said mandrel, and power means to rotate said pulleys and said belt in such a direction that the belt over said portion of said one pulley will engage the casing and move the casing past said cutting means whereupon the cut casing will fall away from the mandrel and over said belt with the interior of the casing exposed.

10. In a casing splitting machine, a frame, a mandrel having one end thereof mounted to said frame with the other end thereof being unsupported whereby a casing may be slipped over said mandrel, casing cutting means mounted on said frame and positioned to intersect and cut an upper portion of said casing at a first point between the ends of the mandrel, a pair of pulleys rotatively mounted on said frame, one of said pulleys having one portion of its periphery adjacent said mandrel below said upper portion of said casing at a second point between the unsupported end thereof and said first point, a belt about said pulleys and having a plurality of sharp spikes projecting therefrom, the other of said pulleys being beyond said mandrel mounting from said first point, said belt being positioned on said pulleys such that the spikes on the portion of the belt adjacent the mandrel project generally toward said mandrel, said pulleys being so positioned that said spikes are at an angle with respect to the horizontal, power means to rotate said pulleys and said belt in such a direction that the belt over said portion of said one pulley will engage the casing and move the casing past said cutting means whereupon the cut casing fall away from the mandrel and over said belt with the interior of the casing exposed, and a plate mounted on said frame and fitting about the upper portion of said belt between said first point and said other pulley, said plate being at such an angle that the entering edge with respect to the movement of the belt is behind said belt from the spiked side thereof while the opposite edge is beyond said spikes whereby said casings will be lifted from said spikes as said belt moves past said plate.

11. In a casing splitting machine, a frame, a mandrel having one end thereof mounted to said frame with the other end thereof being unsupported whereby a casing may be slipped over said mandrel, a power-driven rotary knife mounted on said frame and positioned to intersect and cut an upper portion of said casing at a first point between the ends of the mandrel, a pair of pulleys rotatively mounted on said frame, one of said pulleys having one portion of its periphery adjacent said mandrel below said upper portion of said casing at a second point between the unsupported end thereof and said first point, a belt about said pulleys, said belt being relatively narrow as compared with the circumference of said casings, said belt having a plurality of sharp spikes projecting therefrom, the other of said pulleys being beyond said one end of said mandrel from said first point in such a position that the portion of the belt adjacent said mandrel is substantially parallel to said mandrel, said pulleys and said belt being so positioned that said projecting spikes are at an angle with respect to the horizontal, guard means on said mandrel to spread said casing in the area adjacent said two points, power means to rotate said pulleys and said belt in such a direction that the portion of the belt adjacent the mandrel moves toward the supported end of the mandrel whereby the spikes on said belt will engage the casing and move the casing past said knife whereupon the cut casing will fall away from the mandrel and over said belt with the interior of the casing exposed, and means attached to said frame and positioned adjacent said belt between said one end of said mandrel and said other pulley to lift said casing from said spikes on said belt and permit the casing to fall to one side of the belt.

12. A casing splitting and cleaning machine including a frame, a mandrel having one end thereof mounted to said frame with the other end thereof being unsupported whereby a casing may be slipped over said mandrel, casing cutting means mounted on said frame and positioned to intersect and cut an upper portion of said casing at a first point between the ends of the mandrel, a pair of pulleys rotatively mounted on said frame, one of said pulleys having one portion of its periphery adjacent said mandrel below said upper portion of said casing at a second point between the unsupported end thereof and said first point, a belt about said pulleys and having casing engaging means, said belt being relatively narrow as compared with the circumference of said casings, the other of said pulleys being beyond said mandrel mounting from said first point, power means to rotate said pulleys and said belt in such a direction that the belt over said portion of said one pulley will engage the casing and move the casing past said cutting means whereupon the cut casing will fall away from the mandrel and over said belt with the interior of the casing exposed, and liquid spray means attached to said frame and extending from the vicinity of the cutting means toward said other pulley, said spray means being adjacent said belt and positioned to direct a spray of washing liquid at and around the belt following, with respect to the direction of movement of the belt from the first point to the other pulley, to wash the exposed interior of the casing.

13. A casing splitting and cleaning machine including a frame, a mandrel having one end thereof mounted to said frame with the other end thereof being unsupported whereby a casing may be slipped over said mandrel, casing cutting means mounted on said frame and positioned to intersect and cut an upper portion of said casing at a first point between the ends of the mandrel, a pair of pulleys rotatively mounted on said frame, one of said pulleys having one portion of its periphery adjacent said mandrel below said upper portion of said casing at a second point between the unsupported end thereof and said first point, a belt about said pulleys and having casing engaging means, said belt being relatively narrow as compared with the circumference of said casings, the other of said pulleys being beyond said mandrel mounting from said first point, power means to rotate said pulleys and said belt in such a direction that the belt over said portion of said one pulley will engage the casing and move the casing past said cutting means whereupon the cut casing will fall away from the mandrel and over said belt with the interior of the casing exposed, liquid spray means attached to said frame and extending from the vicinity of the cutting means toward said other pulley, said spray means being adjacent said belt and positioned to direct a spray of washing liquid at and around the belt following, with respect to the direction of movement of the belt from the first point to the other pulley, to wash the exposed interior of the casing, and a bumper plate mounted on said frame and positioned adjacent the belt to contact the original exterior of the casing as the latter is being sprayed to open out any pockets in the casing for washing.

14. A casing splitting and cleaning machine including a frame, a mandrel having one end thereof mounted to said frame with the other end thereof being unsupported whereby a casing may be slipped over said mandrel, a power-driven rotary knife mounted on said frame and positioned to intersect and cut an upper portion of said casing at a first point between the ends of the mandrel, a pair of pulleys rotatively mounted on said frame, one of said pulleys having one portion of its periphery adjacent said mandrel below said upper portion of said casing at a second point between the unsupported end thereof and said first point, a belt about said pulleys, said belt being relatively narrow as compared with the circumference of said casings, said belt having a plurality of sharp spikes projecting therefrom, the other of said pulleys being beyond said one end of said mandrel from said first point in such a position that the portion of the belt adjacent said mandrel is substantially parallel to said mandrel, said pulleys and said belt being so positioned that said projecting spikes are at an angle with respect to the horizontal, guard means on said mandrel to spread said casing in the area adjacent said two points, power means to rotate said pulleys and said belt in such a direction that the portion of the belt adjacent the mandrel moves toward the supported end of the mandrel whereby the spikes on said belt will engage the casing and move the casing past said knife whereupon the cut casing will fall away from the mandrel and over said belt with the interior of the casing exposed, means attached to said frame and positioned adjacent said belt between said one end of said mandrel and said other pulley to lift said casing from said spikes on said belt and permit the casing to fall to one side of the belt, and liquid spray means attached to said frame and extending from the vicinity of the cutting means toward said other pulley, said spray means being adjacent said belt and positioned to direct a spray of washing liquid at and around a portion of the belt between the first point and said last mentioned means to wash the exposed interior of the casing.

15. A casing processing machine including a frame, a pair of pulleys rotatably mounted on said frame, a belt about said pulleys, said belt being relatively narrow as compared with the circumference of said casings, power means connected to one of said pulleys to rotate said pulleys and move said belt in a predetermined direction, means on said frame to split the casings and to drape the casings over said belt at a first point along said belt with the interior wall of the casings outwardly over the belt, liquid spray means attached to said frame and positioned adjacent said belt, said spray means extending from the vicinity of said splitting means along said portion of said belt in the direction of movement thereof, to spray washing liquid over the casings on said belt, and a corrugated plate associated with said frame and positioned below said portion of said belt to contact the exterior wall of said casings to open the pockets in the casings as the casings are washed with said liquid.

OGDEN A. CLEMENS.
RAYMOND O. MERTENS.
MAX WALCKHOF.

References Cited in the file of this patent

UNITED STATES PATENTS

| Number | Name | Date |
|---|---|---|
| 550,986 | Lowry | Dec. 10, 1895 |
| 698,523 | Kohlepp et al. | Apr. 29, 1902 |
| 744,712 | Bitterling | Nov. 24, 1903 |
| 1,479,104 | Lytle | Jan. 1, 1924 |
| 1,523,465 | Villemer | Jan. 20, 1925 |

FOREIGN PATENTS

| Number | Country | Date |
|---|---|---|
| 72,291 | Germany | Dec. 12, 1893 |
| 281,399 | Germany | Jan. 6, 1915 |